UNITED STATES PATENT OFFICE.

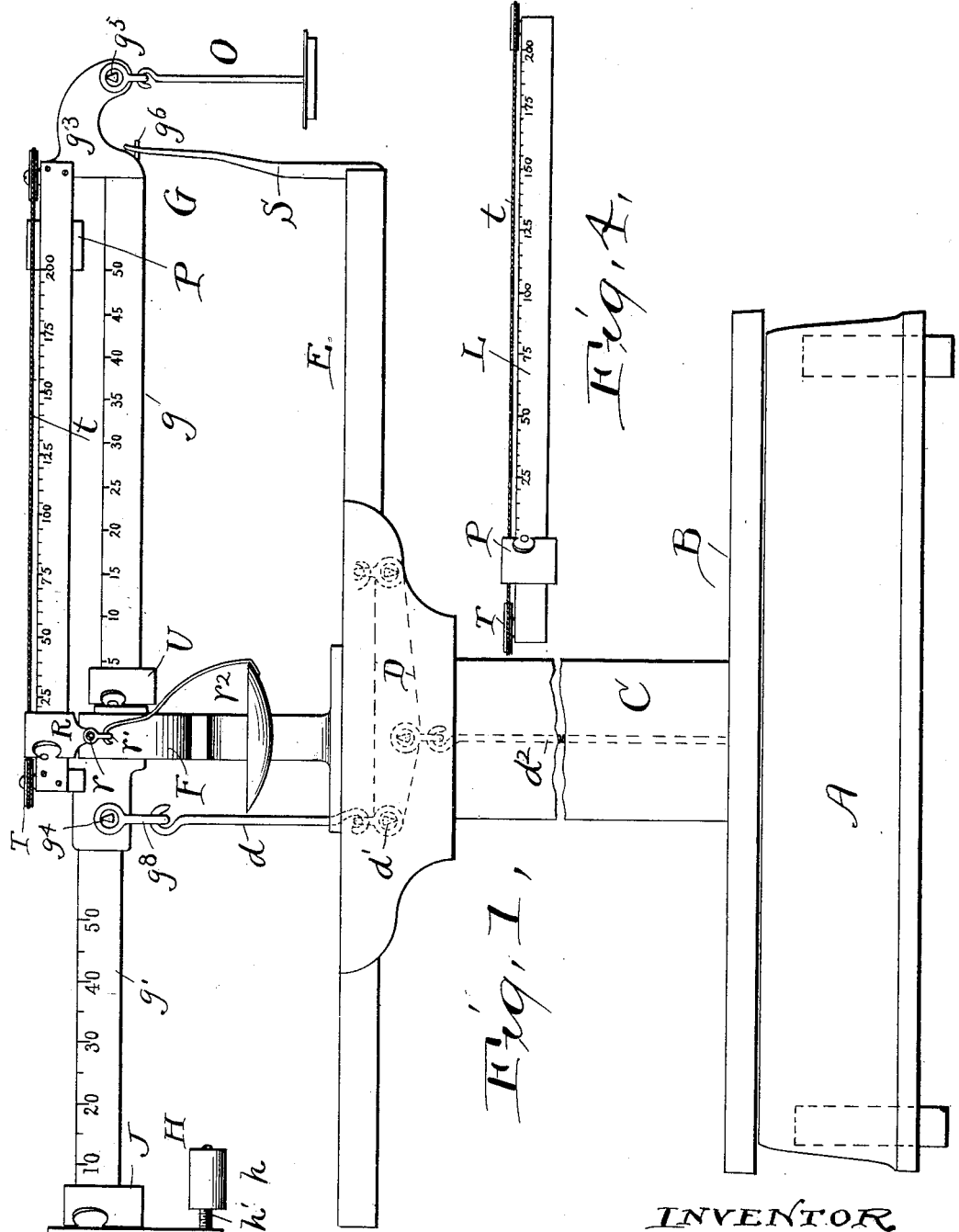

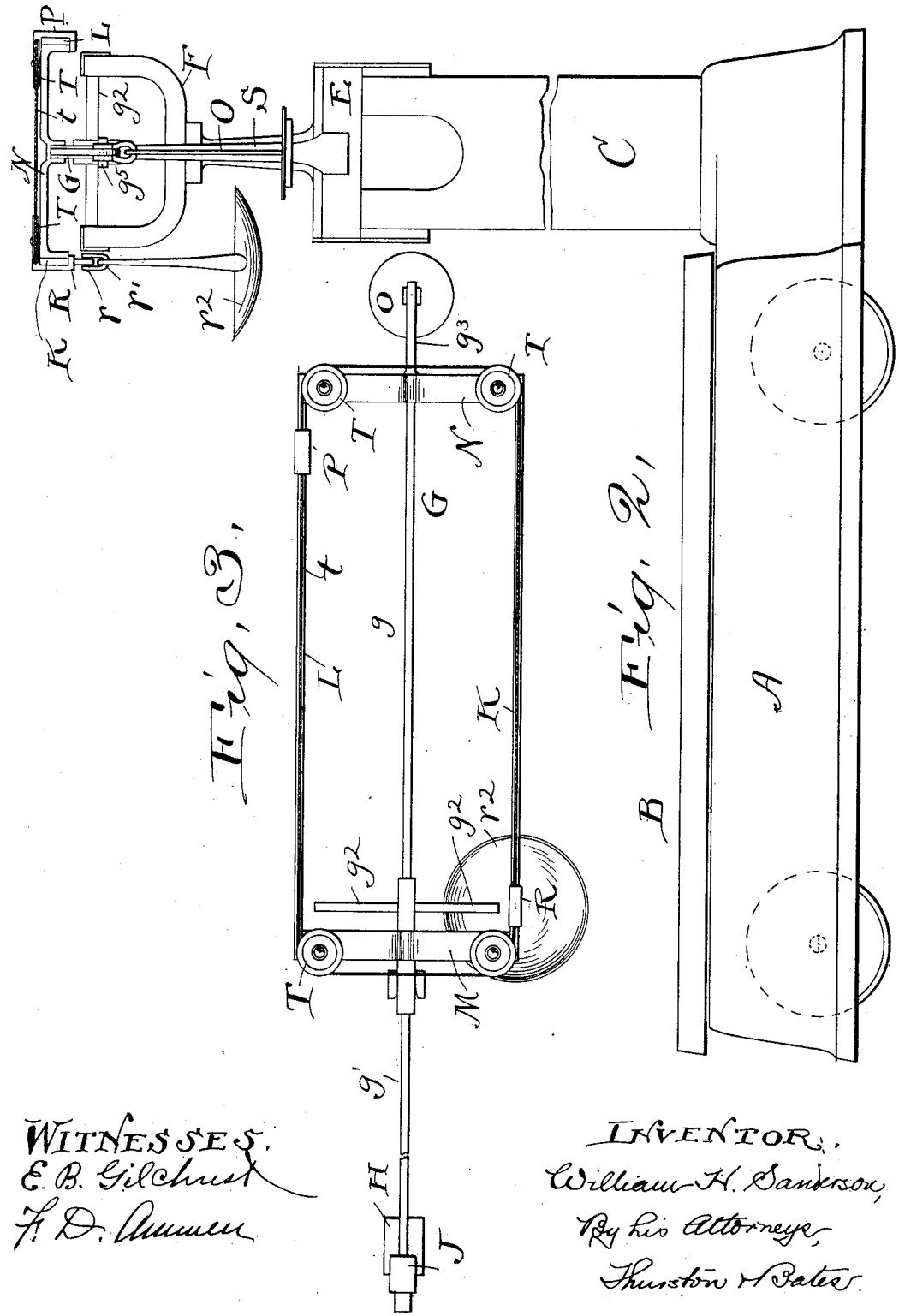

WILLIAM H. SANDERSON, OF CLEVELAND, OHIO, ASSIGNOR TO THE NATIONAL COMPUTING SCALE COMPANY, OF SAME PLACE.

WEIGHING AND COUNTING MACHINE.

SPECIFICATION forming part of Letters Patent No. 659,830, dated October 16, 1900.

Application filed February 26, 1900. Serial No. 6,481. (No model.)

*To all whom it may concern:*

Be it known that I, WILLIAM H. SANDERSON, a citizen of the United States, residing at Cleveland, in the county of Cuyahoga and State of Ohio, have invented a certain new and useful Improvement in Weighing and Counting Machines, of which the following is a full, clear, and exact description, reference being had to the accompanying drawings.

My invention is for an improved weighing and counting machine; and it has for its object to provide a novel machine which may be used to indicate the weight of such article as may be loaded upon it or to indicate the number of pieces of similar size and weight which is in a given lot or to indicate when any given number of such pieces is on the platform.

The invention consists in the construction and combination of parts hereinafter described, and pointed out definitely in the claims.

In the accompanying drawings, Figure 1 is a front elevation of my improved weighing and counting machine. Fig. 2 is a side elevation of said weighing and counting machine, and Fig. 3 is a plan view of the weighing-beam and associated parts. Fig. 4 is a rear view of the beam L.

The invention as shown is embodied in a platform-scale of a familiar type. Such scales include a base, on which platform-levers are mounted, a column upon the base, a weighing-beam fulcrumed on the top of said column, and a draft-rod or other suitable connection between the platform-levers and weighing-beam.

The novel features of my invention are to be found in the construction of the weighing-beam and its parts and in the combination therewith of poises and their connections and attachments, to be hereinafter described, whereby the scale is adapted to be used as a counting-machine as well a weighing-machine. Obviously, therefore, the invention is not limited to a platform-scale, but is capable of embodiment in any form of scale which employs a scale-beam. For example, the platform, platform-levers, and draft-rod connections with the beam G might all be omitted from the scale shown and the load hung directly from the loop $g^8$ or its equivalent.

Referring to the parts by letters, A represents the base; C, the vertical hollow column which is secured to one end of the base, and E represents a cap fastened to the top of said column.

B represents the scale-platform, which in scales of this character are supported by platform-levers, which are not shown herein because the construction of such levers is well understood. Commonly the platform-levers are connected with the weighing-beam directly by a single draft-rod. In the preferred construction as shown, however, a lever D is pivoted at one end to the cap E, and the other end of this lever is connected with the weighing-beam G by means of a draft-rod $d$ and the loops $g^8$ and $d'$, as shown. This lever D is connected with the platform-levers by means of the draft-rod $d^2$.

The weighing-beam G is fulcrumed on its knife-edge pivots $g^2$ in the forks of a standard F, which is superposed upon the cap E. The beam G has a weighing-bar $g$, having at its outer end a neck $g^3$, from which is suspended, by means of knife-edge pivots $g^5$, a counterpoise O in the form of a pendant, upon which additional counterpoise-weights may be hung. To the rear of the draft-pivot $g^4$, with which the loop $g^8$ is connected, is a second weighing-bar $g'$, which is a rigid part of the beam G. It may be provided on its outer end with a vertically-adjustable arm H, bearing a horizontal screw $h'$, along which a balance-weight $h$ may be adjusted. This bar $g'$ is graduated, the zero of graduation being nearest its outer end, and it is fitted with a sliding counterpoise J, adjusted in weight to said graduations and adapted to counterbalance loads upon the scale-platform and to indicate by its position with respect to the graduation-marks upon the beam the weight of such load. The weighing-bar $g$ is also graduated and marked in units of weight, and a movable poise U is fitted thereon and is adapted to be moved along the same end to indicate by its position with respect to said graduation-marks the weight of the load which it balances upon the scale-platform.

Secured to and forming a part of the weighing-beam G are two transverse bracket-arms N and M. Two horizontal counting-bars K and L are secured, respectively, to opposite ends of these arms and lie parallel to and on opposite sides of the bar $g$. Upon the outer ends of the bracket-arms N and M are four sheaves T in the same horizontal plane, and they are mounted on vertical axes, whereby they are free to rotate. The front counting-bar K is graduated from its inner end outward. The poise R, which is movable upon this counting-bar, registers with the zero of graduation thereon when preferably its center of gravity is in the same vertical plane with the fulcrum $g^2$ of the beam. From this poise is suspended, by means of knife-edge pivots $r$ and loops $r'$, a pan $r^2$ for the reception of a weight. The graduations upon this bar K are so placed that each graduation shall represent one unit upon the platform whatever that unit may be—that is to say, that if a ten-pound weight be placed upon the platform it will be balanced by a one-pound weight in the pan $r^2$ when the poise R has been moved along the beam K so that it registers with the graduation "10." So, also, if ten ounces were placed on the platform they would be balanced by one ounce in the pan when the poise was at the position indicated. The other bar L is graduated similarly to the bar K, except that the zero-point is at its outer end and the graduation increased from this point toward the fulcrum. The poise P is sealed or adjusted to the exact weight of the poise R and pan $r^2$. A connecting flexible cord $t$ is passed around the sheaves T and made fast to the poises P and R in such manner that when the poise R is in its normal position at zero on the bar K the poise P is in like manner in normal position at zero on the bar L. The movement outward of the poise R by the operator will cause a simultaneous and equal movement of the poise P inward upon the bar L, so that both poises will indicate on their respective bars the same number of graduations, and so long as the pan $r^2$ is empty the beam G will remain in balance irrespective of the position of the poises R and P.

The beam G, with its various bars and poises and attachments, is balanced up when all of the poises are upon their respective zero-marks, and a pin $g^6$ on the outer end of this beam passing through an aperture in the beam-stop S controls the vertical movements of said beam.

If now it is required to pack articles of like character and weight—such, for example, as nuts and screws—in lots of, say, one gross each, one such nut is placed in the pan $r^2$ and the poise R is moved out on bar K to the graduation "144" thereon. Then similar nuts are placed on the platform B until the scale is balanced, at which time one hundred and forty-four of such nuts will be found upon the platform.

Should it be desired to pack or otherwise dispose of the goods in, say, five-gross lots, then when five of such articles are placed in the pan $r^2$ at the "144" mark on the beam K it will require five gross of such articles on the platform to bring the scale to balance.

When it is desired to pack, say, two hundred like articles in each package, the empty package, with its cover, is placed upon the platform and its tare taken by moving the poise from the zero-point until the balance is obtained. One of the articles is placed in the pan $r^2$, and poise R is then moved out until it reaches the "200" mark on the beam K, and the articles are poured into the package until the scale is brought to balance. The described scale is also useful for ascertaining the number of like articles in a given lot—as, for example, the product from a given machine or for a given length of time. The articles to be counted are placed upon the platform or other form of load-receiver, and one of the articles is placed in the pan $r^2$. The poise carrying this pan is moved along the beam until the scale is in balance, at which time the graduation on the beam with which the poise registers will indicate the number of the articles upon the platform. The weight of any article placed upon this platform may be ascertained by moving the poise R back to the zero-graduation and then moving either the poise J or U along its beam until the scale is brought to balance. Auxiliary weights may of course be employed, and these weights will be hung upon the poise O. It will be understood, however, that there may be many cases where the weight of the articles is of no consequence and it is only desired to ascertain the number. For use for these purposes the scale might be constructed without the graduated bar $g$, but with only the two bars L and K.

Having described my invention, what I claim as new, and desire to secure by Letters Patent, is—

1. In a scale, the combination of a pivoted weighing-beam having two parallel bars which are similarly but oppositely graduated, the zero of graduation of one bar being at its inner end and the zero of graduation of the other bar being at its outer end, with a movable poise on the former bar, means for suspending a weight from said poise, a movable poise upon the other bar, and mechanism connecting said two poises whereby the movement of one poise is necessarily accompanied by an equal movement of the other poise in the opposite direction, substantially as and for the purpose specified.

2. In a scale, the combination of a pivoted weighing-beam having two parallel bars which are similarly but oppositely graduated, the zero of graduation of one bar being at its inner end and the zero of graduation of the other bar being at its outer end, with a movable poise on the former bar, a pan suspended from said poise, a movable poise upon the other bar, four sheaves mounted on vertical axes on said weighing-beam near the ends of said bars, and cords connecting said two poises and passing around said sheaves, substantially as and for the purpose specified.

3. In a scale, the combination of a pivoted weighing-beam having on one side of its fulcrum means for supporting the load and having upon the other side of its fulcrum two parallel bars which are similarly but oppositely graduated, the zero of graduation of one bar being at its inner end and of the other bar at its outer end, with two movable poises upon said two bars, a pan suspended from the poise upon the first-named bar, and mechanism connecting said poises whereby the movement of one is necessarily accompanied by an equal movement of the other in the opposite direction, substantially as and for the purpose specified.

4. In a platform-scale, the combination with a pivoted weighing-beam and two parallel bars fixed thereto and similarly but oppositely graduated, the zero of graduation of one bar being at its inner end and of the other bar at its outer end, a sliding poise on the first-named bar which when at the zero of graduation is over the beam-fulcrum, means for suspending a weight from said poise, a second poise on the other graduated bar, which poise when at the zero-point is balanced up with the beam, and means for connecting said poises whereby the movement of one causes the equal opposite movement of the other to the end that both poises will register with corresponding indications on their respective bars, substantially as and for the purpose specified.

5. In a platform-scale, the combination with a weighing-beam having a centrally-placed bar graduated to indicate weights, and a poise adapted to slide thereon, with two transverse bracket-arms forming a part of said beam and extending on opposite sides of the weighing-bar, two oppositely-graduated bars secured respectively to the ends of said bracket-arms, sheaves mounted on vertical axes in the outer ends of said bracket-arms, two poises movable respectively on said two oppositely-graduated bars, the flexible connection connecting said two poises and passing around said sheaves, and means for suspending a weight from the poise which is at zero at the inner end of its bar, substantially as and for the purpose specified.

6. In a scale the combination of a pivoted beam having, on one side of the fulcrum, means for supporting the load, and having, upon the other side of the fulcrum, two parallel bars, of which one is graduated substantially as described, with two poises movable upon said two bars respectively and adapted to balance up with the beam when one of them is at the inner end of its bar and the other at the outer end of its bar, a weight-holder suspended from and forming a part of the poise which is at the inner end of its bar when the poise on the graduated bar is at the zero of graduation, and mechanism connecting said two poises whereby the movement of one poise is necessarily accompanied by the equal movement of the other poise in the opposite direction, substantially as and for the purpose specified.

In testimony whereof I hereunto affix my signature in the presence of two witnesses.

WILLIAM H. SANDERSON.

Witnesses:
E. L. THURSTON,
ALBERT H. BATES.